United States Patent
Horn et al.

(10) Patent No.: US 7,043,610 B2
(45) Date of Patent: May 9, 2006

(54) SYSTEM AND METHOD FOR MAINTAINING CACHE COHERENCY WITHOUT EXTERNAL CONTROLLER INTERVENTION

(75) Inventors: Robert Horn, Yorba Linda, CA (US); Biswajit Khandai, Foothill Ranch, CA (US)

(73) Assignee: Aristos Logic Corporation, Foothill Ranch, CA (US)

( * ) Notice: Subject to any disclaimer, the term of this patent is extended or adjusted under 35 U.S.C. 154(b) by 518 days.

(21) Appl. No.: 10/429,047

(22) Filed: May 5, 2003

(65) Prior Publication Data

US 2004/0034750 A1 Feb. 19, 2004

Related U.S. Application Data

(60) Provisional application No. 60/404,139, filed on Aug. 19, 2002.

(51) Int. Cl.
*G06F 12/00* (2006.01)

(52) U.S. Cl. .................. 711/144; 711/114; 711/113; 711/141

(58) Field of Classification Search ............ None
See application file for complete search history.

(56) References Cited

U.S. PATENT DOCUMENTS

| | | | |
|---|---|---|---|
| 5,381,539 A | 1/1995 | Yanai et al. | |
| 5,734,814 A | 3/1998 | Corbin et al. | |
| 6,163,773 A | 12/2000 | Kishi | |
| 6,760,807 B1* | 7/2004 | Brant et al. | 711/114 |
| 2003/0079081 A1* | 4/2003 | Okada et al. | 711/113 |
| 2003/0084238 A1* | 5/2003 | Okada et al. | 711/113 |
| 2003/0097524 A1* | 5/2003 | Brant et al. | 711/114 |
| 2003/0221070 A1* | 11/2003 | Minowa et al. | 711/147 |
| 2004/0205296 A1* | 10/2004 | Bearden | 711/129 |
| 2005/0216669 A1* | 9/2005 | Zhu et al. | 711/118 |

* cited by examiner

Primary Examiner—Kevin Verbrugge
(74) Attorney, Agent, or Firm—Dickstein Shapiro Morin & Oshinsky LLP

(57) ABSTRACT

A disk array includes a system and method for cache management and conflict detection. Incoming host commands are processed by a storage controller, which identifies a set of at least one cache segment descriptor (CSD) associated with the requested address range. Command conflict detection can be quickly performed by examining the state information of each CSD associated with the command. The use of CSDs therefore permits the present invention to rapidly and efficiently perform read and write commands and detect conflicts.

21 Claims, 8 Drawing Sheets

| | |
|---|---|
| COMMAND DESCRIPTOR BLOCK | 501 |
| NETWORK CONTEXT | 502 |
| TIME STAMP | 503 |
| STATE INFORMATION | 504 |
| CSD POINTERS | 505 |

| | |
|---|---|
| VOLUME | 601a |
| LBA | 601b |
| STATE | 602 |
| USAGE COUNT | 603 |
| FLAGS | 604 |
| PENDING CONFLICTS | 605 |
| LINKS | 607 |

SYSTEM AND METHOD FOR MAINTAINING CACHE COHERENCY WITHOUT EXTERNAL CONTROLLER INTERVENTION

This application claims the benefit of U.S. Provisional Application No. 60/404,139, filed on Aug. 19, 2002.

BACKGROUND OF THE INVENTION

1. Field of the Invention

The present invention relates to the field of networked storage systems, and more particularly, to a system and method for cache management in networked storage systems.

2. Description of the Related Art

With the accelerating growth of Internet and intranet communication, high bandwidth applications (such as streaming video), and large information databases, the need for networked storage systems has increased dramatically. FIG. 1 illustrates an exemplary network storage system 100 comprising a plurality of hosts 10a–10c. The hosts may be, for example, web servers, database servers, or file/print servers, which have additional network connections (not illustrated) for serving a plurality of client computers (not illustrated). The hosts 10a–10c are coupled via their respective network links 11a–11c to a network 20. Also coupled to the network 20 is at least one storage controller 30. The storage controller 30 is coupled to a cache memory 40. The storage controller 30 is also coupled to the network 20 via network link 12. Finally, the storage controller 30 is coupled, via link 13a, to each of the plurality of storage devices 50a–50d of the storage system 100. In many instances, the storage system 100 includes at least one additional link 13b for coupling the storage controller 30 to the storage devices 50a–50d, in order to increase reliability and/or performance.

Each of the storage devices 50a–50d include addressable units, such as blocks. One addressing system commonly used is known as logical block addressing, in which a sequence of blocks from each device is assigned a corresponding sequence of integers known as logical block addresses (hereinafter "LBA"). The sequence of LBAs restart for each device. The blocks of the storage devices 50a–50d can be mapped in a number of ways to form one or more logical volumes (not illustrated in FIG. 1) which are the targets of the read and write commands issued by the hosts 10a–10c. Typically, the hosts 10a–10c address the logic volumes organized within the storage devices 50a–50d, using a volume address and a logical block address. This combination of addresses is also known as an equivalent address.

Additionally, a number of well known redundancy mechanisms can be used in connection with the logical volumes, so that different logical volumes are operated using different redundancy techniques. For example, one logical volume can be operated in a mirrored (i.e., "RAID-1") mode while another logical volume can be operated using "RAID-5" redundancy. These redundancy mechanisms generally involve recording an additional copy of the data (e.g., RAID-1) and/or parity information (e.g., RAID-5) on the storage devices 50a–50d so that the data contained on any one or more storage device can be automatically reconstructed from the remaining storage devices in the event of an failure. The redundant information is typically not addressable by the hosts 10a–10c. Instead, the hosts continue to address the data using the combination of a storage device or logical volume identifier plus an LBA. If the identifier is associated with a failed storage device, the storage controllers 30a, 30b will use the redundant information and service the request by the host by transferring the requested data.

One important consideration for the network storage system 100 is its performance, especially in high utilization systems. The use of caching is critical to realizing the highest performance level from a network storage system 100. Caching is a technique where a copy of frequently used and/or recently used data is stored in a faster form of memory. For example, in disk systems, cache memories may be comprised of semiconductor memories, which have an access speed of at least one order of magnitude faster than the access speed of a disk drive. By storing a copy of frequently or recently used data, the cache anticipates future read requests and collects write data. When a read or write request addressed to a block already stored in a cache memory is received, the storage controller 30 may satisfy the request by reading or writing the data to the cache memory 40 instead of the slower disk drives 50a–50d.

Unfortunately, conventional approaches to cache management and command conflict detection in a network storage system 100, such as continuous maintenance of command lists within the cache (as disclosed in U.S. Pat. No. 5,381,539), deletion of logical block address (LBA) space duplicates, and creation of additional segments are computationally intense. This leads to a reduction in data retrieval rates, difficulty in coalescing writes, and an increase in command execution times. Accordingly, there is a need and desire for a system and method to provide cache management that supports low cost cache management in high performance storage systems.

SUMMARY OF THE INVENTION

The present invention is a system and method of cache management and command conflict detection in networked storage systems. In accordance with the present invention, the logical block address (LBA), over the entire range requested by the host, is compared with a series of cache sector state lists, and the host command structure is updated with a pointer to a cache segment descriptor (CSD) containing the matching LBA. The invention efficiently detects and resolves command conflicts in a cache while processing multiple overlapping commands. The invention prevents duplicate allocation of LBA space in a cache, and quickly searches ranges of LBA space in a cache. The invention also advantageously reallocates cache resources in real time, coalesces write operations in the cache, and maintains cache coherency without requiring the intervention of the system or controller microprocessor.

BRIEF DESCRIPTION OF THE DRAWINGS

The foregoing and other advantages and features of the invention will become more apparent from the detailed description of exemplary embodiments of the invention given below with reference to the accompanying drawings, in which.

DETAILED DESCRIPTION OF THE PREFERRED EMBODIMENT

Figure 1:
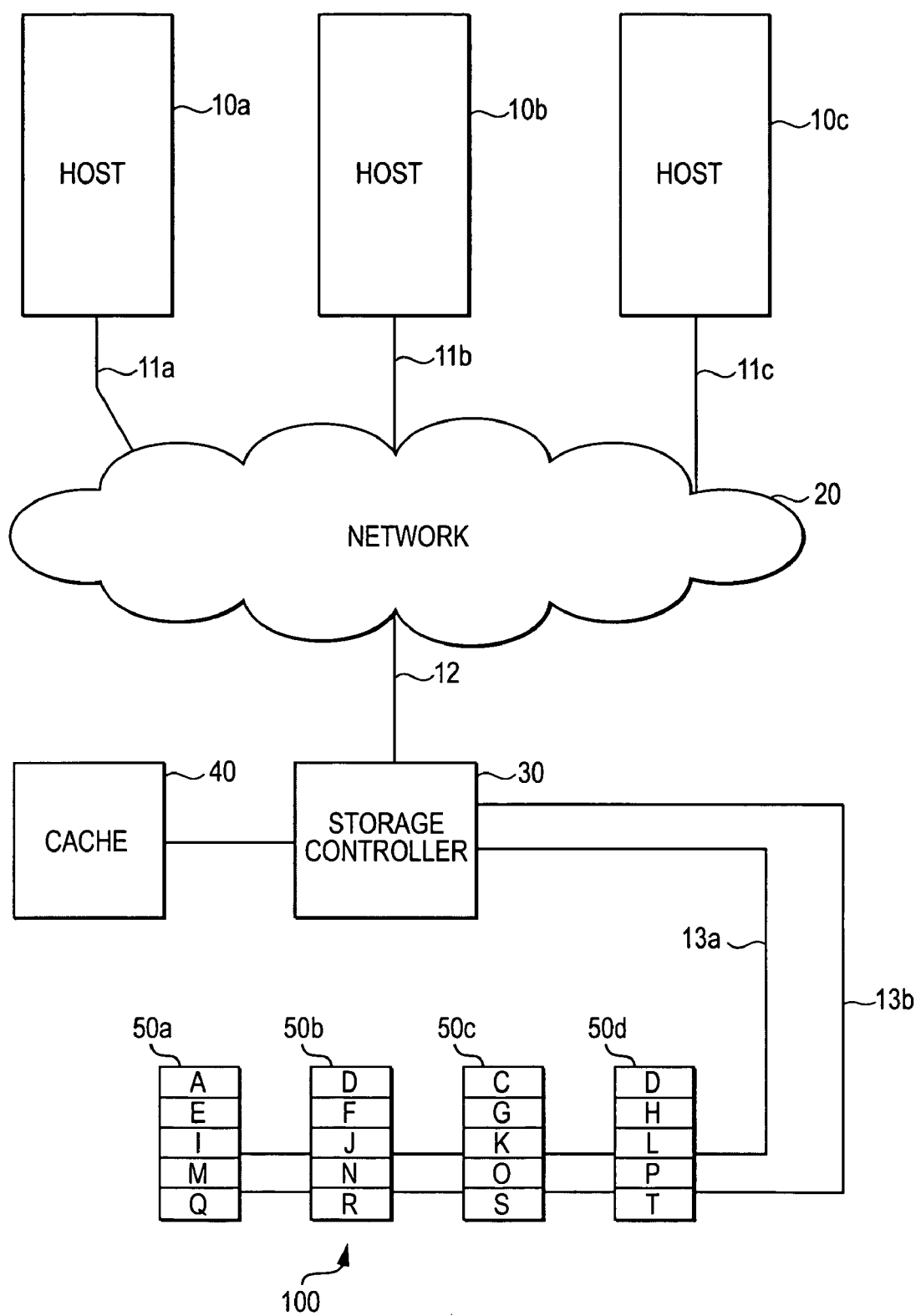
FIG. 1 is a block diagram of a typical network storage system.
Figure 2:
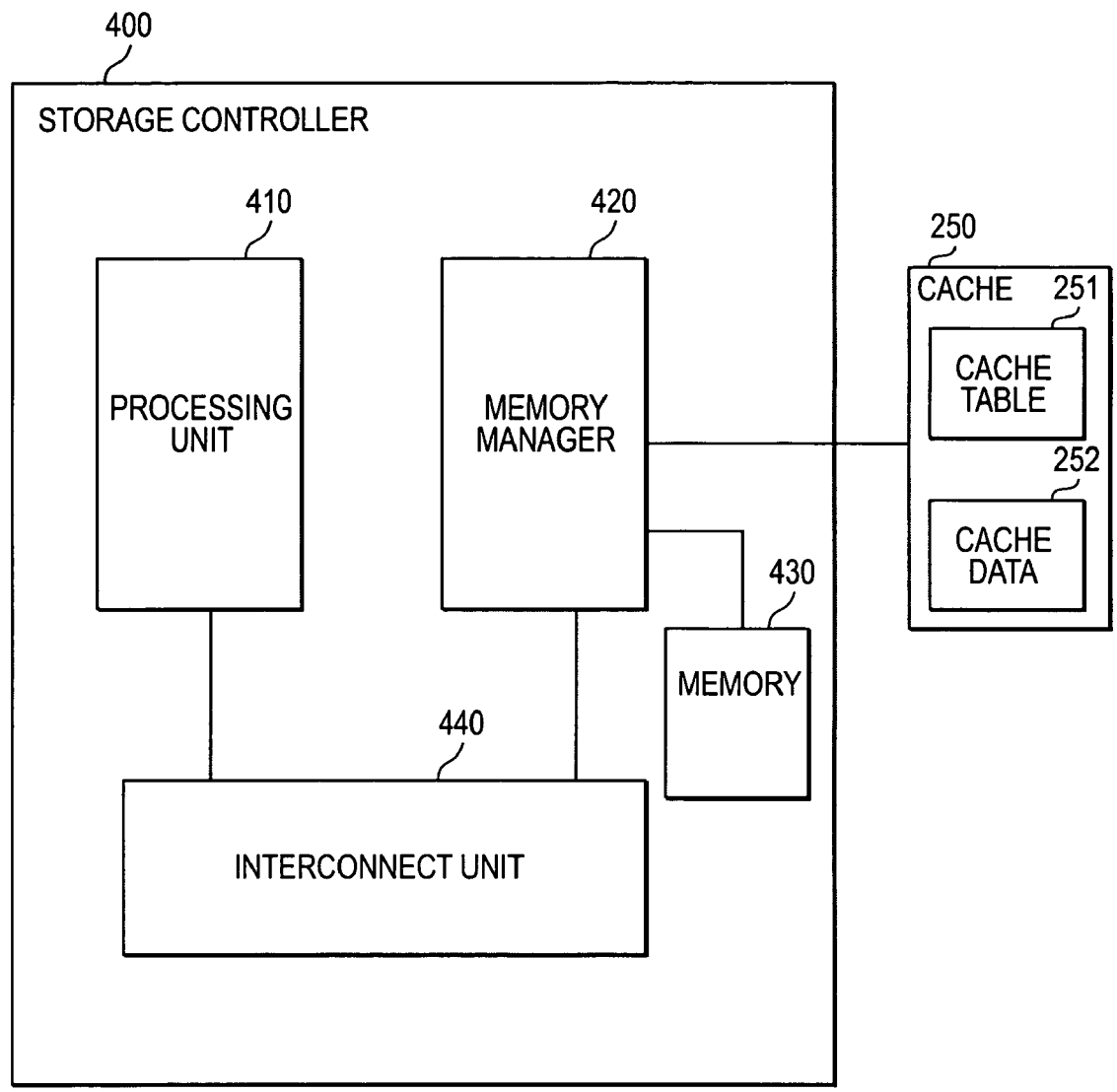
FIG. 2 is a block diagram of the storage controller of the present invention.

Now referring to the drawings, where like reference numerals designate like elements, there is shown in FIG. 2 a block diagram of a storage controller 400 and cache 250 used in the present invention. Read and write transactions are executed by the storage controller 400 through the use of the cache memory 250. All host commands for reads and writes are serviced by the cache memory 250. All disk commands are generated to fill or flush the cache memory 250. The cache memory 250 has a cache state granularity which matches the sectoring of the disks 50a–50d. The cache memory 250 preferably has an allocation granularity equal to $2^N$ blocks, where N is an integer. In one exemplary embodiment, the cache allocation granularity is 32 blocks. All data transfers are between the disks 50a–50d and the cache 250 or between the hosts 10a–10d and the cache 250. Commands may be executed out-of-order to maximize throughput. Command conflicts, i.e., any situation where two or more commands when executed out of may degrade data integrity, are detected and resolved in the present invention through the operation of the cache 250 by the storage controller 400.

As illustrated in FIG. 2, the storage controller 400 includes a processing unit 410 and a memory manager 420. The memory manager 420 preferably includes logic for manipulating linked lists and is typically coupled to a memory 430 and a cache memory 250. In the exemplary embodiment shown in FIG. 2, the memory 430 is an internal memory while the cache memory 250 is an external memory, although the location of the memory can obviously be varied. Both the processing unit 410 and the memory manager 420 are coupled to an interconnect unit 440, which manages communications between the processing unit 410 and the memory manager 420. For example, the interconnect unit 440 may be a bus. However, it should be recognized that the architecture of the storage controller 400 may be varied to accommodate different situations. For example, in one exemplary embodiment, suitable for use in demanding environments, there are a plurality of processing units 410 to increase processing throughput, a plurality of memory managers 420 to increase memory bandwidth, and the interconnect unit 440 is a communications switch in order to maximize communications throughput between the processing units 410 and the memory managers 420.

Figure 3:
FIG. 3 is a diagram of the Host Exchange Nexus data structure.

FIG. 3 is an illustration of a data structure known as the Host Exchange Nexus 500. This data structure is a record by the storage controller 400 to store information regarding each outstanding command received from the hosts 10a–10c. Thus, at any given time, the storage controller 400 may be managing a plurality of Host Exchange Nexus 500 data structures. The storage controller 400 manipulates the Host Exchange Nexus 500 data structures using the processing unit 410, the memory manager 420, and the memory 430. In order to assure an adequate amount of storage, a predetermined amount of memory associated with the memory manager 420 is allocated for use as Host Exchange Nexus 500. The memory manager 420 maintains the allocated memory as a free list of Host Exchange Nexus 500.

As illustrated in FIG. 3, each Host Exchange Nexus 500 includes five fields 501–505. More specifically, field 501 is a Command Descriptor Block used to store a command received from one of the hosts 10a–10c. A host command typically includes the command (e.g., "read" or "write"), a volume identifier, and an address range to be affected by the command. The volume identifier may be any sort of identifier used by the disks. For example, if the disks were SCSI disks, the volume identifier could be a SCSI logical unit number ("LUN"). The address range may be specified as a series of LBAs, or equivalently, as a combination of a starting LBA and a length field. Field 502 is used to store context information from the network 20. For example, in one exemplary embodiment, the network 20 is a Fibre Channel fabric, and field 502 would store Fibre Channel context information associated with the Fibre Channel frame used by a host 10a–10c used to transmit the command stored in the Command Descriptor Block 501. Field 503 is a Time Stamp field used to store the time when the command was received from the host 10a–10c. Field 504 stores state information associated with the Host Exchange Nexus 500 record, including, for example, points to the next and previously allocated Host Exchange Nexus 500 so as to permit a plurality of Host Exchange Nexus 500 data structures to form a linked list. Finally, field 505 is used to store a plurality of pointers to Cache Segment Descriptors (CSDs), described below.

Figure 4:
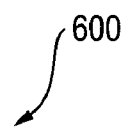
FIG. 4 is a diagram of the Cache Segment Descriptor data structure.

FIG. 4 is an illustration of a data structure known as the Cache Segment Descriptor (CSD) 600. The CSD 600 is a data structure located in the cache tables 251 portion of the cache memory 250, and the processing unit 410 via the memory manager 420. The cache memory 250 has its data storage 252 organized into a plurality of segments, each of which store data from a plurality of sectors, beginning with a global LBA. In one exemplary embodiment, each cache segment stores data from 32-sectors beginning from an LBA address which is a multiple of 32. Each CSD 600 in the cache tables 251 is associated with a corresponding segment in the cache data 252. Cached data is stored in cache segments, while status information regarding the cached data is stored in corresponding CSDs 600.

As illustrated in FIG. 4, each CSD 600 includes the following fields. Field 601a is used to store the volume, and field 601b is used to store the starting LBA of the corresponding segment in the cache data. Field 602 is used to store the corresponding states of the plurality of sectors in the corresponding segment. These states include are described in Table 1, below:

TABLE 1

Cache Segment Descriptor Sector States

| State | Description |
|---|---|
| Valid | Sector contains valid read data not yet transferred to host. |
| Valid Deallocate | Sector contains valid read/write data already transferred to the host/disk, or previously dirty data that has been successfully staged to disk. |
| Invalid | Sector contains no valid data. |
| Reserved for Read | Sector reserved for volume read operation. |
| Reserved for Write | Sector reserved for host write operation. |
| Dirty Reserved | Sector reserved for host write which was previously dirty. |
| Dirty Mirrored | Sector contains write data that has not been transferred to the disk. |
| Flush Active | Sector contains data being (or about to be) flushed to disk. |

Field 603 is used to storage a usage count, indicating the number of outstanding transactions which are relying upon this CSD 600. Field 604 is used to store status flags. Field 605 is used to point to pending conflict records. The pending conflict 605 field is for command conflict processing, and will be described in greater detail below. In one preferred embodiment, the pending conflicts 605 are pointers to linked lists of pointers to Host Execution Nexus corresponding to the command(s) which raised these exceptions.

The memory manager 420 can use the links in field 607 to associate each CSD 600 with other CSDs 600 to form lists. For example, to facilitate a rapid search for a CSD 600 having a particular volume and LBA address, the processing unit 410 hashes the volume and LBA address and searches the bin corresponding to the hash result. Each bin is a linked list of CSDs which share the same volume and LBA hash result. This process is also known as binning and each such list is known as a bin. The memory manager 410 may manage additional lists. In the exemplary embodiment, the memory is used to construct the following lists: a free list of unallocated CSDs 600; an invalid list of all CSDs 600 which are marked invalid; and a valid deallocate list of all CSDs 600 which are marked valid deallocate; and a valid list of all CSDs which are marked valid.

Figure 5A:
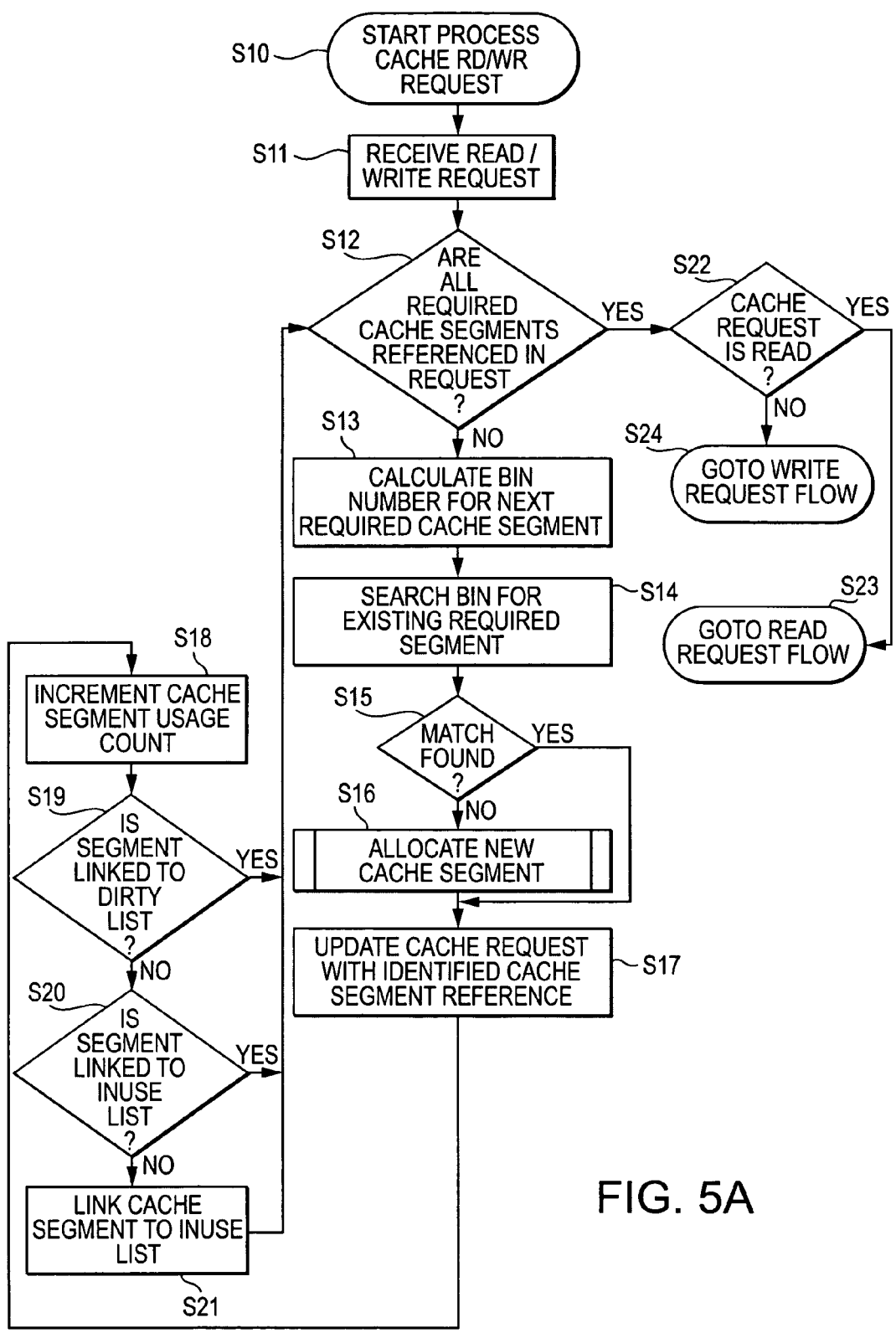
FIGS. 5A, 5B, and 5C are flow charts describing read and write processing.
Figure 5B:
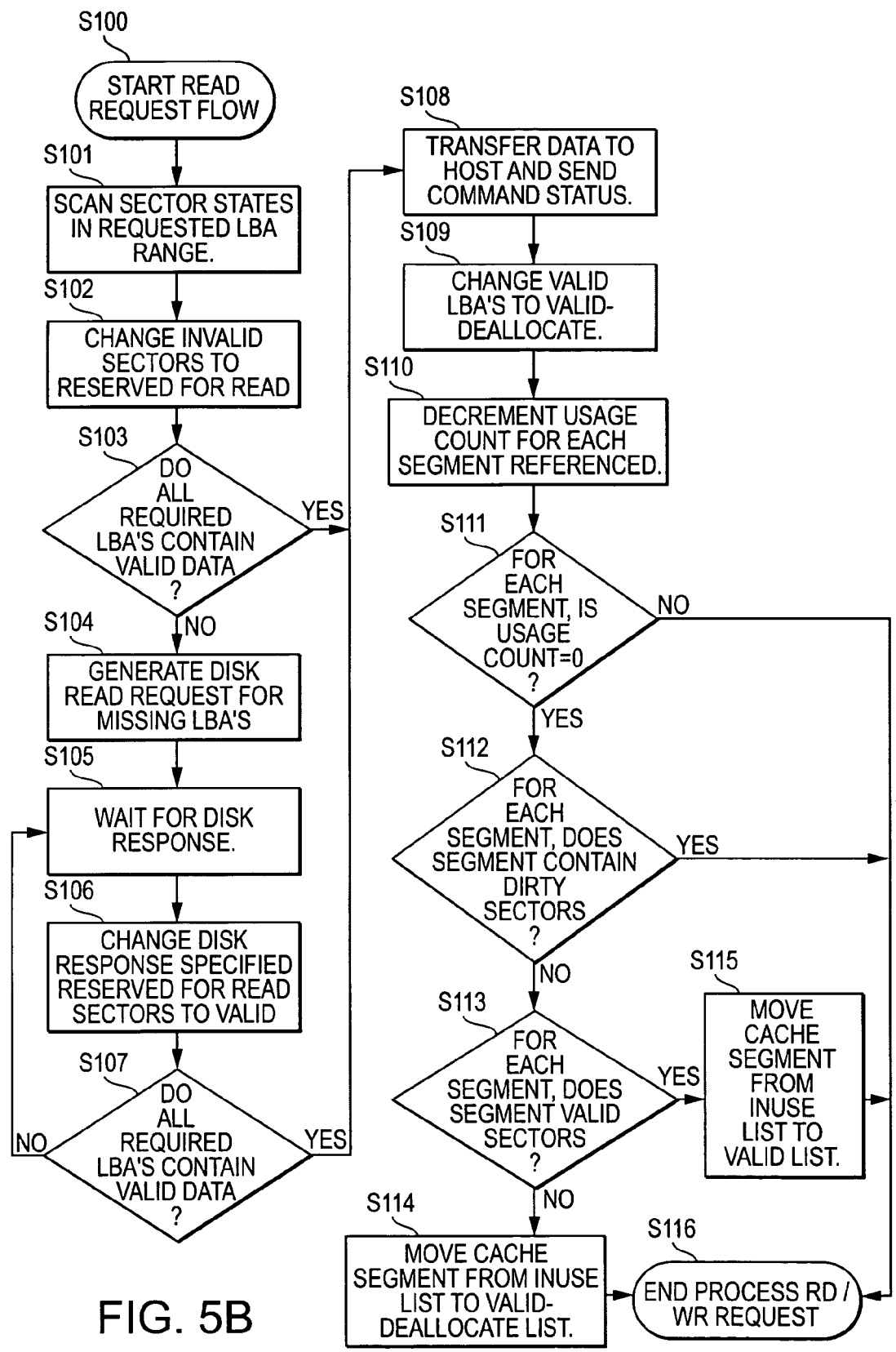
Figure 5C:
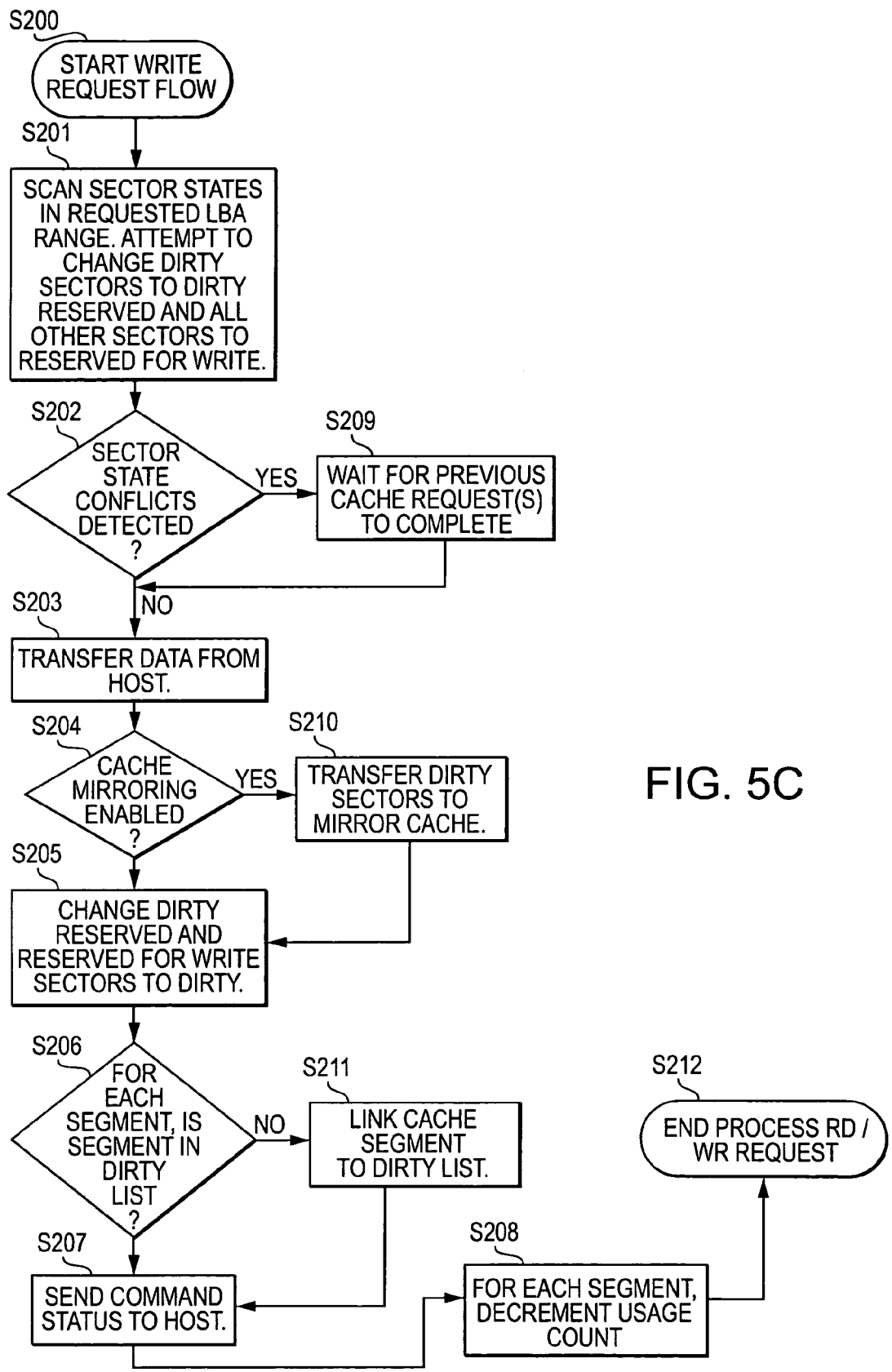

FIGS. 5A–5C are flow charts illustrating how the storage controller 400 processes a read or write command received from one of the hosts 10a–10c. The process begins at steps S10–S11 (FIG. 5A), where the storage controller 400 receives a read or write request from one of the hosts 10a–10c. The storage controller 400 allocates a Host Exchange Nexus 50, and writes a network context and the current time into fields 502–503, respectively. The storage controller 400 decodes the command and writes the Command Descriptor Block 501. The command decode includes verification of the requested volume and LBA ranges. While many host commands will only affect one CSD, since each CSD services a limited address space (e.g., 32 sectors in one exemplary embodiment) and are aligned (e.g., the start LBA of each CSD in one exemplary embodiment are multiples of 32), a host command can read or write address ranges implicating multiple CSDs. Thus, the starting volume and LBA address for each CSD within the volume/LBA range requested by the host command is recorded in the Command Descriptor Block 501. The state field 504 is initialized to a default state, and the current starting volume and LBA address is set to be the first starting volume and LBA address in the Command Descriptor Block 501.

Steps S12–S21 are directed at ensuring that the cache includes every cache segment associated with the host requested address range. More specifically, step S12 checks to see whether all of the cache segments associated with the host requested address range have been preprocessed. If so, execution continues at steps S22–S24, where read commands continue processing at steps S100–S116 of FIG. 5B and write commands continue processing at steps S200–S212 of FIG. 5C. Otherwise, execution continues at steps S13–S21.

At step S13, the storage controller 400 calculates the bin number associated with the current cache segment. During the first time through the loop S12–S21, the current cache segment would have the same volume and LBA address as the starting volume and starting LBA address. At each subsequent time through the loop S12–S21, the current cache segment becomes a next cache segment. As previously noted, each CSD 600 is stored on a linked list in accordance with a hash function to permit rapid searching. At step S14, the storage controller 400 searches for the cache segment having the calculated bin number. At step S15, if the cache segment being searched for is found, execution continues at step S17. Otherwise at step S16, a new cache segment is allocated as illustrated in FIG. 5E, and then execution continues at step S17.

At step S17 the CSD Pointer in field 505 corresponding to the current cache segment is updated to point to the cache segment descriptor corresponding to the cache segment which was found (step S15) or allocated (step S16). At step S18, the usage count of each cache segment is incremented. In steps S19–S20, the cache segment is checked to see whether it is linked on a dirty or in-use list. If either of steps S19–S20 is a "yes," the current loop iteration ends and execution resumes at step S12 with the current cache segment being set to the next cache segment. Otherwise, if "no" in both steps S19–S20, the cache segment is linked to the in-use list before the next loop iteration begins at step S12.

Now referring to FIG. 5B, the processing (steps S100–S116) performed during a read request is explained. In steps S100–S101, a scan of the sector states of the sectors of the requested LBA range is made. In step S102, any sector state which was set to an invalid state is changed to the reserved for read state. In step S103, each LBA is checked to see whether it contains valid data. If so, execution continues at steps S108. Otherwise, execution continues at step S104, where disk read requests corresponding to the volume/LBA ranges are issued. In step S105, a wait is performed pending disk response. At step S106, each sector which received data from the disk drives is changed from a "reserved for read" to the "valid" state. Step S107 checks whether all cache sectors contains valid data. If so, execution continues at step S108. Otherwise, execution is transferred to step S106.

At step S109, each sector having a valid state is changed to a valid-deallocate state. At step S110, the usage count of each cache segment referenced by the read request is decreased by one. At step S111, the usage count of each cache segment is checked to see if it equals zero. For those cache segments with non-zero usage counts, no additional processing is required for the read command. For those cache segments with a zero reference count, execution continues at step S112, where those segments are checked to see if they contain dirty sectors. For those cache segments which contain dirty sectors, no further processing is required for the read command. For those segments without dirty sectors, execution continues at step S113, where those segments are checked to see if they contain any valid sectors. For each such segment with a valid sector, execution continues at step S115, where the cache segment is moved from the in-use list to the valid list, and no additional processing is required for the read command. For those segments which do no contain any valid sectors, execution continues at step S114, where the segment is moved from the in-use list to the valid-deallocate list. The read process ends at step S116.

Now referring to FIG. 5C, the processing (steps S200–S212) performed during a write request is explained. In steps S200–S202, the sector states for each sector in the requested LBA range is scanned and changed if appropriate. More specifically, steps S201–S202 attempt to change the state of all dirty sectors to "dirty reserved" and all other sector states to "reserved for write." However, sectors which were previously in certain states are conflicted from being changed to the "reserved for write state." More specifically, sectors previously in the "reserved for read" state cannot be changed until after the previous read has been processed. Similarly, sectors in the "reserved for write," "dirty reserved," or "flush active" states also cannot be directly changed to the "reserved for write" state until after the associated disk operation is completed. In step S202 and S209, such changes are postponed until the sectors transition into a "non-conflicting" state.

At step S203, the write data is transferred from the host to the corresponding cache sectors. In step S204, if cache mirroring is enabled, the data from the host (marked dirty) is transferred to the mirror cache (step S210). Regardless of the cache mirroring state, execution then resumes at step S205, where sectors having the "dirty reserve" and "reserved for write" states are changed to the "dirty" state.

At step S206, each cache segment in the LBA range of the write command is checked to see if it is on the dirty list. If not, it is placed onto the dirty list (step S211). Execute resumes at step S207, where completion of the write is sent back to the host as a status message. At step S208, the usage count of each cache segment is decreased by one. The write process ends at step S212.

Figure 5D:
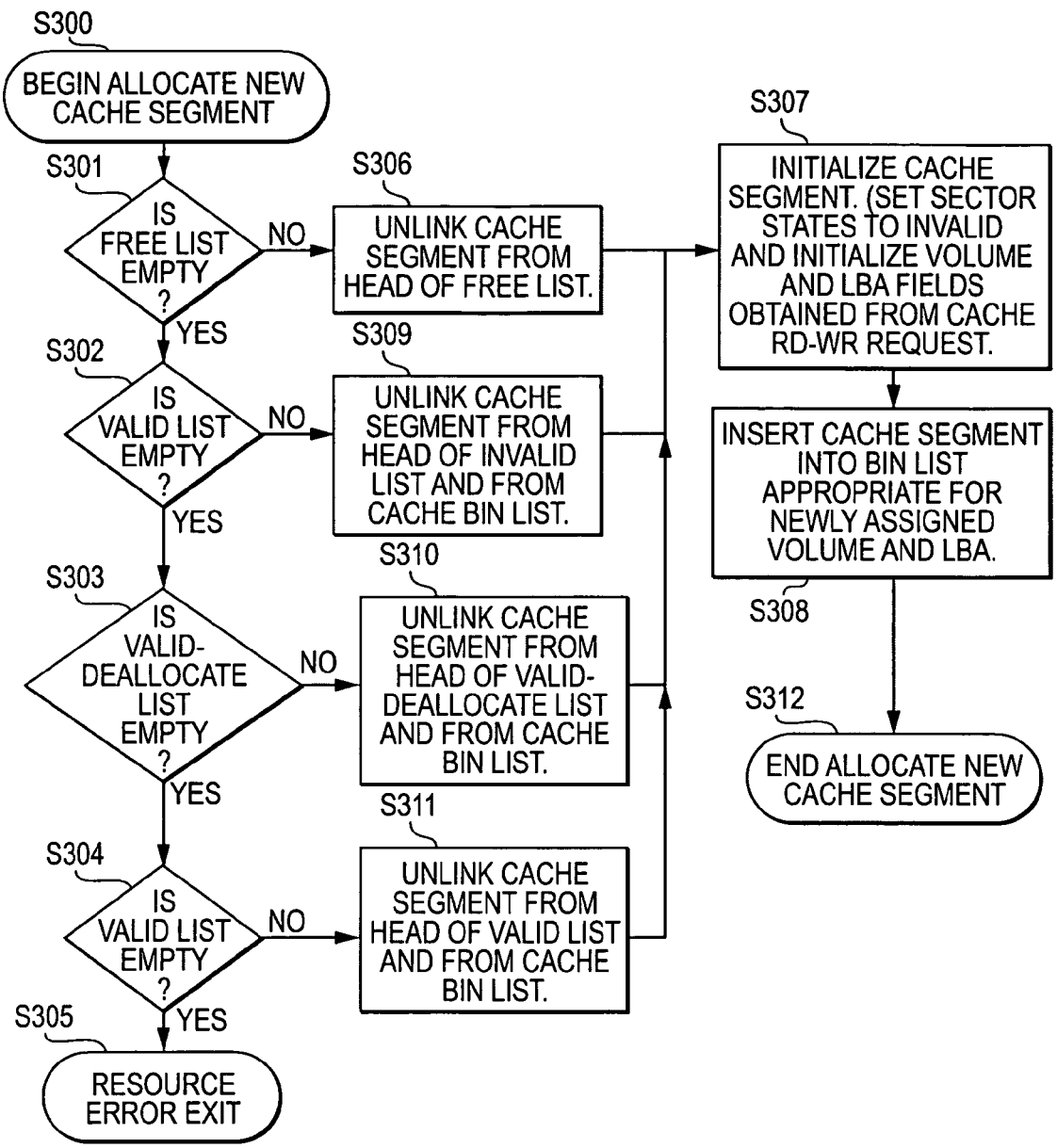
FIG. 5D is a flow chart describing cache allocation.
Figure 5E:
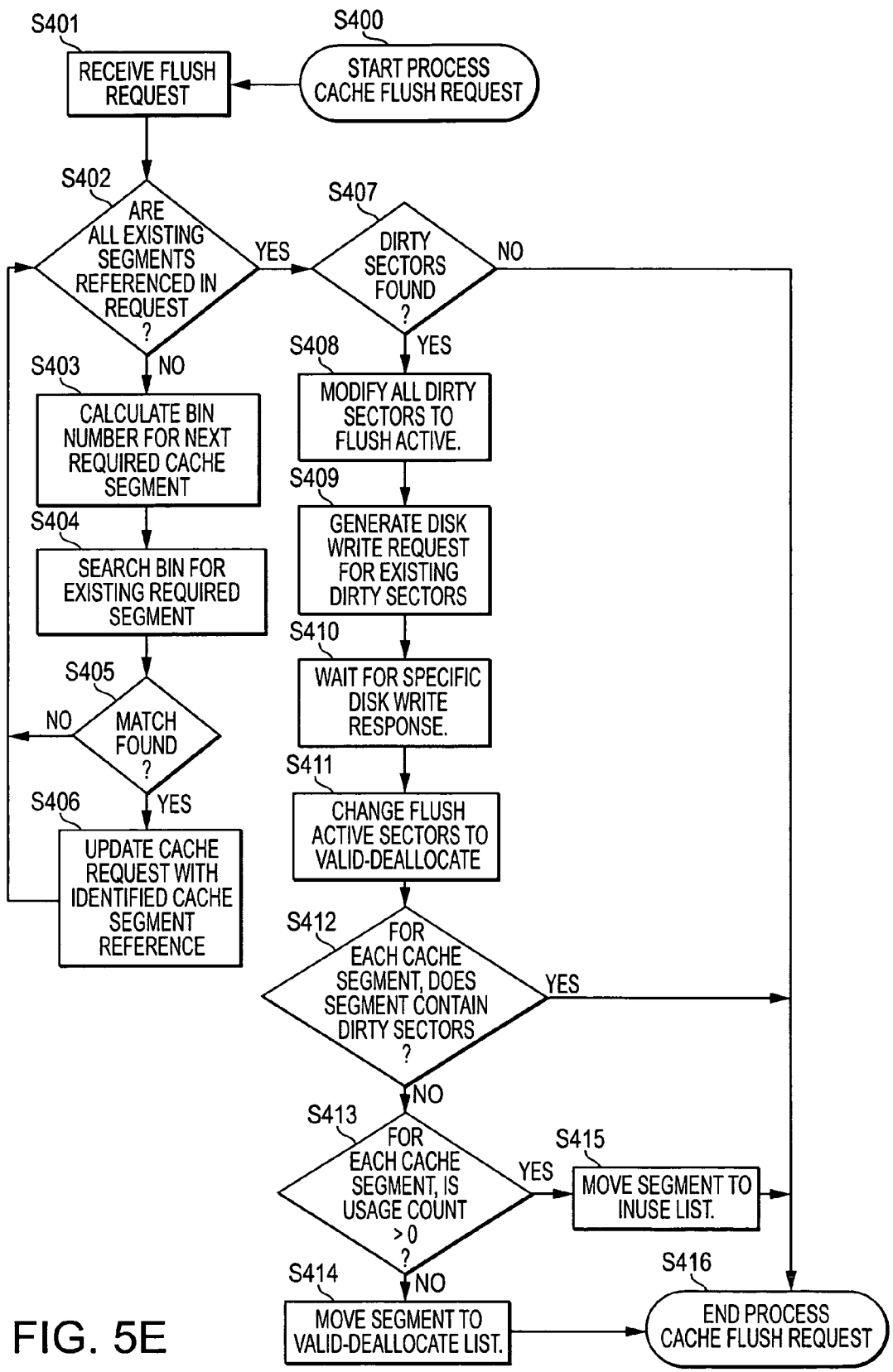
FIG. 5E is a flow chart describing cache flushing.

FIG. 5D is a flowchart illustrating how a cache segment is allocated. The process begins at steps S300–S301, where the free list is checked to see if it is empty. If the free list is empty, i.e., there are no CSDs on the free list, execution continues at step S302. However, if the free list is not empty, execution continues at step S306, where a CSD from the head of the free list is unlinked and allocated for use. Execution then continues at step S307, where the cache segment is initialized by setting its sector states to invalid and initializing the volume and LBA fields of the CSD, from the underlying read or write request which caused the cache allocation. Following step S307, execution continues at step S308, where the cache segment is inserted into the bin list.

At step S302, the invalid list is checked to see if it is empty. If the invalid list is empty, execution continues at step S303. However, if the empty list is not empty, execution continues at step S309, where a CSD from the head of the invalid list is unlinked and where that CSD is also unlinked from the cache bin list. Execution then continues as previously described with respect to steps S307, S308, and S312.

At step S303, the valid-deallocate list is checked to see if it is empty. If it is, execution continues at step S304. However, if it is non-empty, execution continues at step S310, where a CSD from the head of the valid-deallocate list is unlinked and that CSD is also unlinked from the cache bin list. Execution then continues as previously described with respect to steps S307, S308, and S312.

At step S304, the valid list is checked to see if it is empty. If it is, execution terminates at step S305 with a resource error. However, if the list is non-empty, a CSD is unlinked from the head of the valid list and that CSD is also unlinked from the cache bin list. Execution then continues as previously described with respect to steps S307, S308, and S312.

FIG. 5E is a flowchart illustrating how a cache flush request is handled. The process begins at steps S400–S401, when a cache flush request is received in step S401. The storage controller 400 allocates a Host Exchange Nexus 50, and writes a network context and the current time into fields 502–503, respectively. The storage controller 400 decodes the command and writes the Command Descriptor Block 501. The command decode includes verification of the requested volume and LBA ranges. The state field 504 and the CSD Pointers 505 are initialized to a default state. The current cache segment is assigned the starting address of the flush request.

At step S402, the CSD Pointers are checked to see whether they point to each cache segment corresponding to the address range specified in the flush request. If not, execution continues with steps S403–S406. Otherwise, execution continues at step S407.

At step S403, the bin number of the current cache segment is calculated. At step S404, the cache bins are searched for the calculated bin number. In step S405, if a match is found, the CSD Pointers 505 are updated to point to the CSD. Regardless of whether a match is found, execution continues at step S402.

Once the appropriate cache segments are being referenced via the CSD Pointers 505, execution continues at step S407. For each cache segment, if there are no dirty sectors, processing for that cache segment terminates at step S416. If there are dirty sectors, all dirty sectors are changed to the flush active state in step S408. In step S409, disk write requests for these sectors are generated, and the system waits for the disk writes to be processed (Step S410). At step S411, each flush active sector is changed to the valid-deallocate state. At step S412, each cache segment is checked for dirty sectors. For each cache segment without dirty sectors, processing for that cache segment ends at step S416. For each cache segment with dirty sectors, processing continues at step S413, where the usage count for each cache segment is checked to see whether it is greater than zero. If so, the cache segment is moved to the in-use list and processing terminates for that cache segment at step S416. Otherwise, the cache segment is moved to the valid-deallocate list and processing terminates for that cache segment at step S416.

It should be noted that the above described processing may be used to optimize write operations by supporting write coalescing. Write coalescing refers to a process where write data from multiple commands are gathered and then written out to disk (possibly out of order with respect to the original sequence of write commands) such that the data being written to disk is a sequential write. In the above described processing, write data from multiple write commands are stored into the cache memory while state information regarding the write data are stored in corresponding CSDs. Since each address range in a volume is associated with only one CSD and the CSDs are stored in sorted lists organized by volume and LBA addresses, write coalescing may be performed when write data is destaged from the cache. For example, dirty data may be destaged by traversing the valid list of CSDs in address order (to ensure sequential access to the data which require destaging) and by writing out each block spanned by the CSD which is in the "valid" state (i.e., to write out the data not yet transferred to a volume).

In summary, the present invention processes all read and write commands by searching through a plurality of CSDs (data structures associated with a corresponding segments of data in the cache memory and containing state information regarding the data) to identify the one or more CSDs associated with a volume ID and a local address associated with the command. Command conflict detection can be quickly performed by examining the state information of each CSD associated with the command. The use of CSDs therefore permits the present invention to rapidly and efficiently perform conflict detection.

While the invention has been described in detail in connection with the exemplary embodiment, it should be understood that the invention is not limited to the above disclosed embodiment. Rather, the invention can be modified to incorporate any number of variations, alternations, substitutions, or equivalent arrangements not heretofore described, but which are commensurate with the spirit and scope of the invention. Accordingly, the invention is not limited by the foregoing description or drawings, but is only limited by the scope of the appended claims.

What is claimed as new and desired to be protected by Letters Patent of the United States is:

1. A method for operating a cache for a disk array, comprising:
   receiving a host command, said host command including a command type, a volume identifier, and a local address range;
   storing said command type, volume identifier, and local address range in a first data structure;
   locating every cache segment descriptor corresponding to said volume identifier and local address range, wherein each cache segment descriptor stores status information regarding data stored in a corresponding segment of a cache; and
   processing said host command.

2. The method of claim 1, wherein said status information comprises at least one of:
   the volume identifier, the local address range, a usage count, and a state.

3. The method of claim 2, wherein said state comprises at least one of: a dirty state, a dirty-reserved state, a reserved for write state, a valid state, and a valid-deallocate state.

4. The method of claim 1, wherein said step of locating comprises:
   computing at least one address range, wherein said address range corresponds to addresses associated with said cache segment descriptor;
   for said address range,
      calculating a bin number;
      searching a bin associated with said bin number for the cache segment descriptor corresponding to said address range;
      if the cache segment descriptor is not found in the bin, allocating the cache segment descriptor corresponding to said address range; and
      recording an association between the address range cache segment descriptor with said host command in said first data structure.

5. The method of claim 4, wherein the step of recording an association further comprises:
   incrementing a usage count of said cache segment descriptor;
   linking said cache segment descriptor to an in-use list if said address range cache segment descriptor is not linked to a dirty list and said cache segment descriptor is not already on said in-use list.

6. The method of claim 4, wherein said step of allocating the cache segment descriptor comprises:
   if a free list of cache segment descriptors is not empty,
      unlinking a cache segment descriptor from the free list; or
   if an invalid list of cache segment descriptors is not empty,
      unlinking the cache segment descriptor from the invalid list; and
      unlinking the cache segment descriptor from the bin list;
   if a valid-deallocate list of cache segment descriptors is not empty,
      unlinking the cache segment descriptor from the valid-deallocate list; and
      unlinking the cache segment descriptor from the bin list;
   if a valid list of cache segment descriptors is not empty,
      unlinking the cache segment descriptor from the valid list; and
      unlinking the cache segment descriptor from the bin list;
   initializing said unlinked cache segment descriptor; and
   setting said unlinked cache segment descriptor to be said address range cache segment descriptor.

7. The method of claim 6, wherein said step of initializing said unlinked cache segment descriptor comprises:
   setting each one of a plurality of sector state fields to an invalid state;
   setting a volume field of unlinked cache segment descriptor to correspond to the volume identifier of the first data structure; and
   setting a local address range of said unlinked cache segment descriptor to correspond to an address range of the cache segment descriptor.

8. The method of claim 7, wherein said step of setting a local address range comprises setting an address field of said unlinked cache segment descriptor to a starting address of the address range of said address range cache segment descriptor.

9. The method of claim 7, further comprising:
   computing a bin number from the address range of said cache segment descriptor; and
   recording an association between the bin number and the unlinked cache segment descriptor.

10. The method of claim 9, wherein said step of recording an association between the address range bin number and the unlinked cache segment descriptor comprises:
    inserting said unlinked cache segment descriptor into a list of cache segment descriptors associated with the same bin number.

11. The method of claim 10, wherein said list of cache segment descriptors is a sorted list.

12. The method of claim 1, wherein said step of processing said command comprises:
    if said command is a read command,
       for each sector status field in each cache segment descriptor associated with said volume identifier and local address range,
          changing each sector state which is invalid to reserved-for-read;
          generating disk read requests for any sector state which is in a valid state; and
          waiting until each of said generated disk read requests have completed;
       for each cache segment descriptor associated with said volume identifier and local address range, transferring data from the cache associated with each of said cache segment descriptors;
       for each sector status field in each command segment descriptor associated with said volume identifier and local address range, change each sector state which to valid-deallocate.

13. The method of claim 12, further comprising:
    for each cache segment descriptor associated with said volume identifier and local address range,
       decreasing by one an usage count;
       moving said cache segment descriptor from an in-use list to a valid list if said usage count is zero, no associated sector is dirty, and at least one associated sector is valid; and
       moving said cache segment descriptor from an in-use list to a valid-deallocate list if said usage count is zero, no associated sector is dirty, and at each associated sector is invalid.

14. The method of claim 1, wherein said step of processing said command comprises:
if said command is a write command,
for each sector status field in each command segment descriptor associated with said volume identifier and local address range,
repeating the following step until no conflicts are detected, if no conflicts are detected, changing each sector state which is dirty to dirty-reserve, and each sector which is not dirty to reserved-for-write;
transferring write data from host to the cache memory;
if a cache mirror state is enabled, transferring said write data to at least one remote cache;
for each sector status field in each command segment descriptor associated with said volume identifier and local address range,
changing each sector state which dirty-reserved to dirty;
changing each sector state which is reserved-for-write to dirty;
for each cache segment descriptor associated with said volume identifier and local address range,
linking to a dirty list if it is not already on the dirty list; and
decrementing an usage count;
sending a command status to the host.

15. The method of claim 1, wherein said step of processing said command comprises:
if said command is a flush command,
for each sector status field in each command segment descriptor associated with said volume identifier and local address range,
if a sector status is dirty,
changing said sector status to flush-active;
generating write request said sector;
waiting for said write request to complete; and
changing said sector status from flush-active to valid-deallocate.

16. The method of claim 15, further comprising:
for each cache segment descriptor associated with said volume identifier and local address range,
moving to the in-use list if no sector associated with the cache segment descriptor is dirty and if a usage count of the cache segment descriptor is greater then zero; and
moving to the valid-deallocate list if no sector associated with the cache segment descriptor is dirty and if a usage count of the cache segment descriptor is not greater than zero.

17. A cache controller for a disk array, comprising:
an interconnection unit, for transferring information between coupled units;
a processing unit, coupled to said interconnection unit;
a memory manager, said memory manager coupled to interconnection unit and to a first memory; and
a second memory, coupled to said memory manger;
wherein
said memory manager organizes said first memory into a first portion for storing a plurality of cache segment descriptors containing information regarding stored cache
information and a second portion for storing said stored cache information;
said second memory is used to store control information, including a data structure
associating host commands with cache segment descriptors.

18. The cache controller of claim 17, wherein said interconnection unit is a switch.

19. The cache controller of claim 17, wherein each cache segment descriptor is associated with an equal number of sectors.

20. The cache controller of claim 19, wherein each cache segment descriptor maintains state data for each sector.

21. The cache controller of claim 20, wherein the state data comprises,
a valid state for indicating that a sector has valid data not yet transferred to a host or disk;
a valid-deallocate state for indicating that a sector has valid data already transferred to a host or disk;
an invalid state for indicating that a sector contains no valid data;
a reserved-for-read state for indicating that the sector is reserved for a pending read operation;
a reserved-for-write state for indicating that the sector is reserved for a pending write operation;
a dirty-reserved state for indicating the sector is reserved for a host write which was previously dirty;
a dirty-mirrored state for indicating that the sector contains write data which has not been written to the disk; and
a flush active state for indicating that the sector contains data which will be flushed to disk.

* * * * *